US007171555B1

(12) United States Patent
Salowey et al.

(10) Patent No.: US 7,171,555 B1
(45) Date of Patent: Jan. 30, 2007

(54) METHOD AND APPARATUS FOR COMMUNICATING CREDENTIAL INFORMATION WITHIN A NETWORK DEVICE AUTHENTICATION CONVERSATION

(75) Inventors: Joseph Salowey, Seattle, WA (US); William Gossman, Seattle, WA (US)

(73) Assignee: Cisco Technology, Inc., San Jose, CA (US)

( * ) Notice: Subject to any disclaimer, the term of this patent is extended or adjusted under 35 U.S.C. 154(b) by 765 days.

(21) Appl. No.: 10/449,180

(22) Filed: May 29, 2003

(51) Int. Cl.
*H04L 9/00* (2006.01)
*H04L 9/32* (2006.01)

(52) U.S. Cl. .................... 713/156; 713/168; 726/3; 726/4; 726/5

(58) Field of Classification Search ............. 726/1–5; 713/168, 175, 155, 156
See application file for complete search history.

(56) References Cited

U.S. PATENT DOCUMENTS 5,586,260 A * 12/1996 Hu ............................ 726/12
6,256,733 B1 * 7/2001 Thakkar et al. ............ 713/156
6,732,277 B1 * 5/2004 Vandergeest et al. ....... 726/19

OTHER PUBLICATIONS

L. Blunk, et al., "PPP Extensible Authentication Protocol (EAP)," Network Working Group, Request for Comments: 2284, Mar. 1998, pp. 1-15.
J. Salowey, "Protected EAP TLV," Network Working Group, Internet Draft, Mar. 2003, pp. 1-8.
H. Haverinen, et al., "EAP SIM Authentication, draft-haverinen-pppext-eap-sim-10.txt," Point-to-Point Extensions Working Group, Internet Daft, Feb. 2003, pp. 1-58.
Siemens, "Bootstrapping for subscriber certificates," 3GPP TSG SA WG3 Security—S3#26, Nov. 19-22, 2002, Oxford, UK, S3-020636, pp. 1-4.
Nokia, "Comments on S3-020500 'Contribution to discussion on architecture and trust for subscriber certificates,'" Nov. 8, 2002, 3GPP TSG SA WG3 Security—S3#26, Nov. 19-22, 2002, Oxford, UK, S3-020605, 6 pages.
Miikka Poikselkä, "LS on subscriber certificates," 3GPP TSG-SA WG2 Meeting #27, Beijing, China, Oct. 14-18, 2002, Tdoc S2-023130, 9 pages.

* cited by examiner

*Primary Examiner*—Hosuk Song
(74) *Attorney, Agent, or Firm*—Hickman Palermo Truong & Becker LLP

(57) ABSTRACT

A method is disclosed for communicating a security credential within a network device authentication conversation. An authenticator that is coupled to a supplicant through a network performs a first message conversation resulting in creating a security context that is known to the authenticator and the supplicant. A second message conversation is initiated. The second message conversation is cryptographically protected using the same security context. A security credential is provided to the supplicant in the second message conversation. The second message conversation and first message conversation are then concluded. Specific embodiments can bootstrap digital certificates, public/private key pairs, and other credentials to supplicants, in-band, within an EAP-SIM or EAP-AKA conversation and without initiating a new session or exchanging special-purpose keys to protect distribution of the credentials.

47 Claims, 12 Drawing Sheets

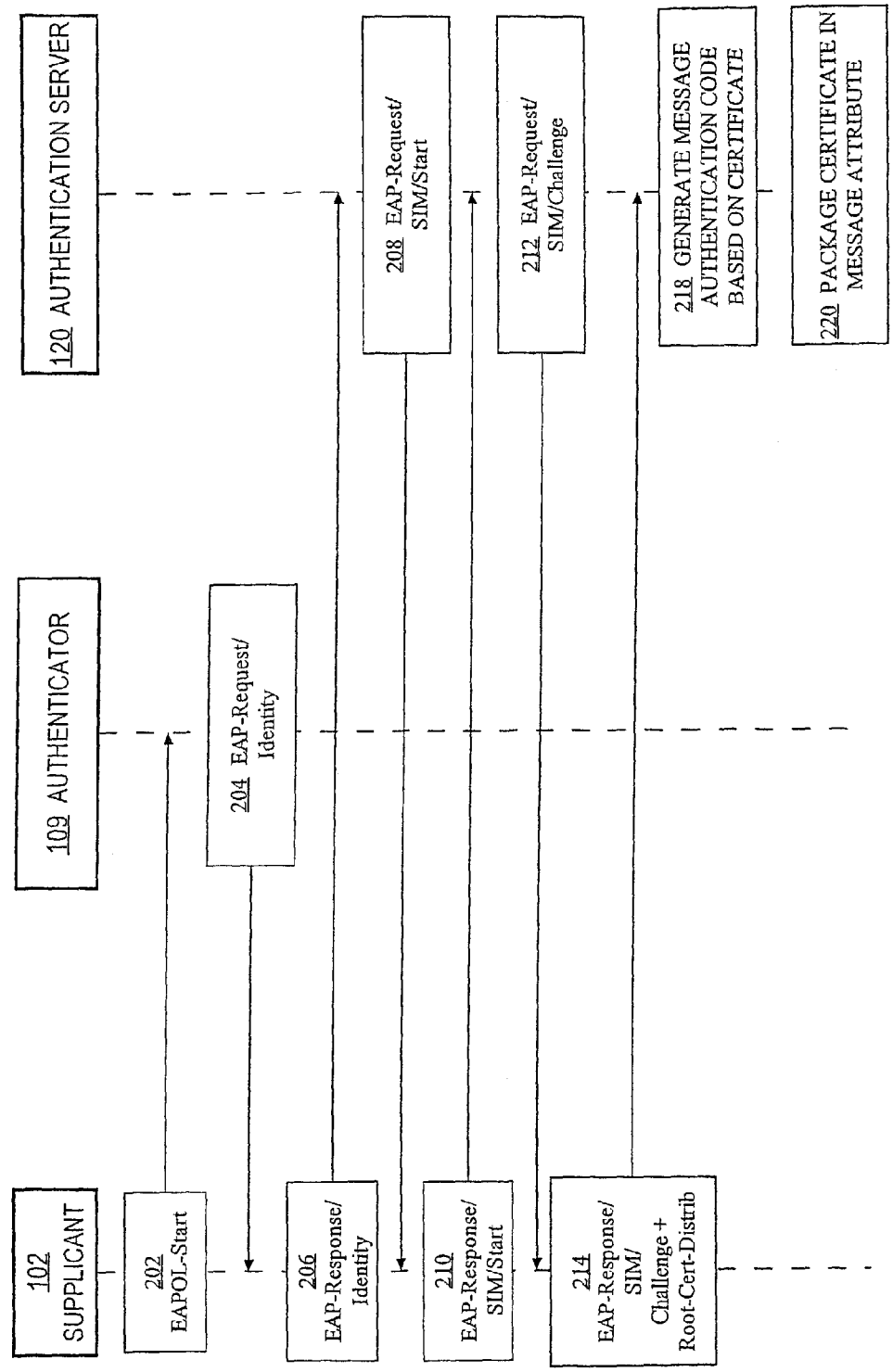

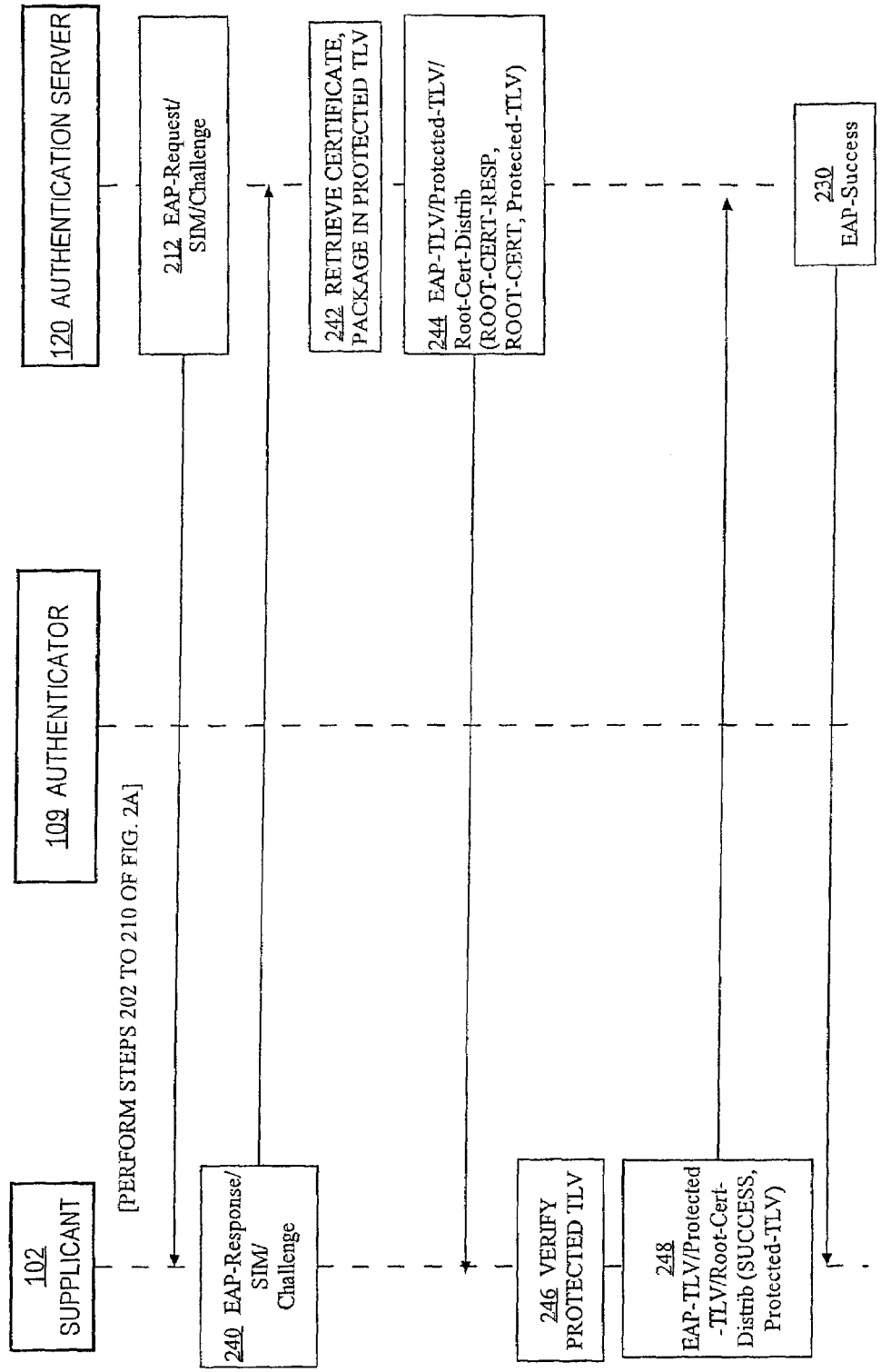

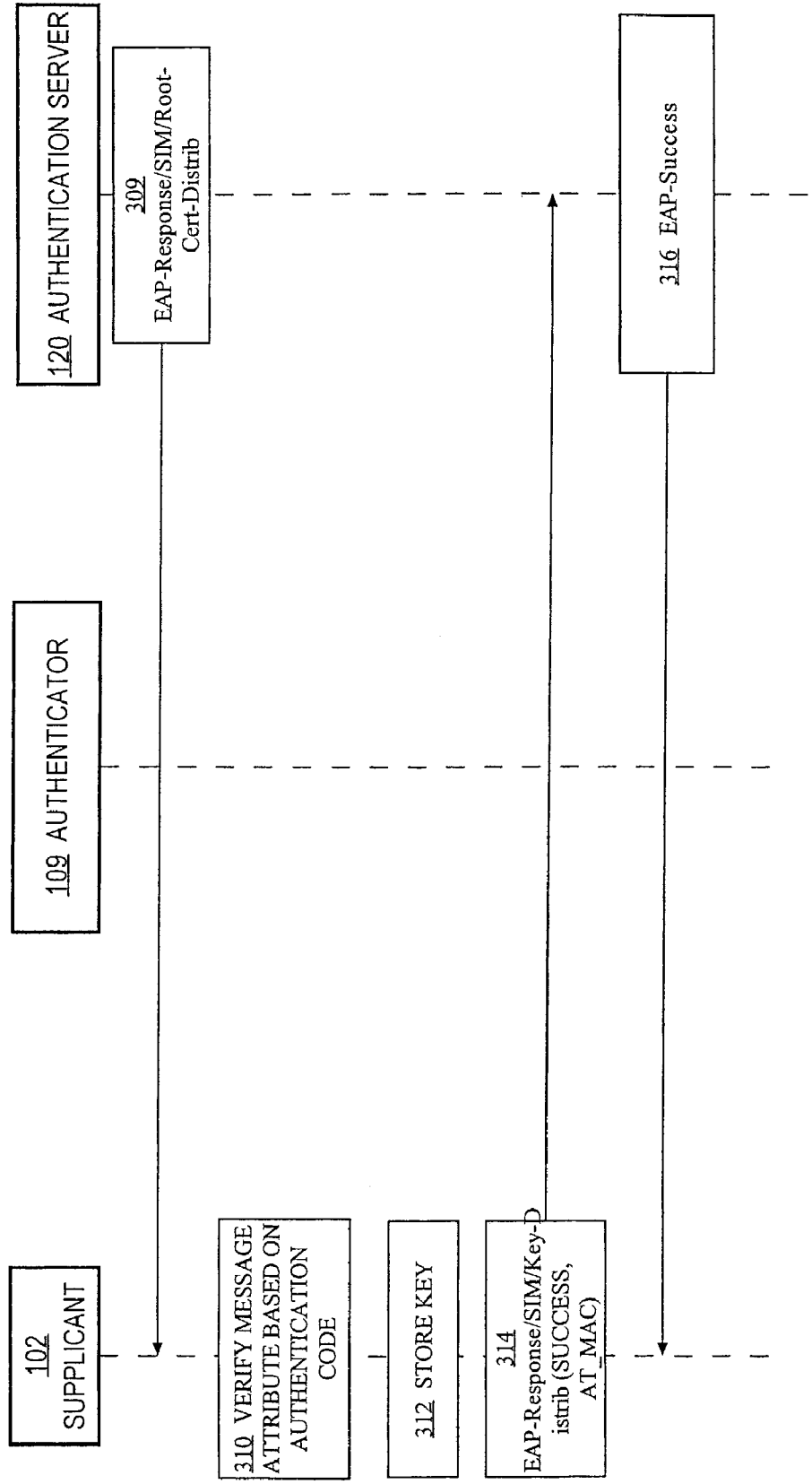

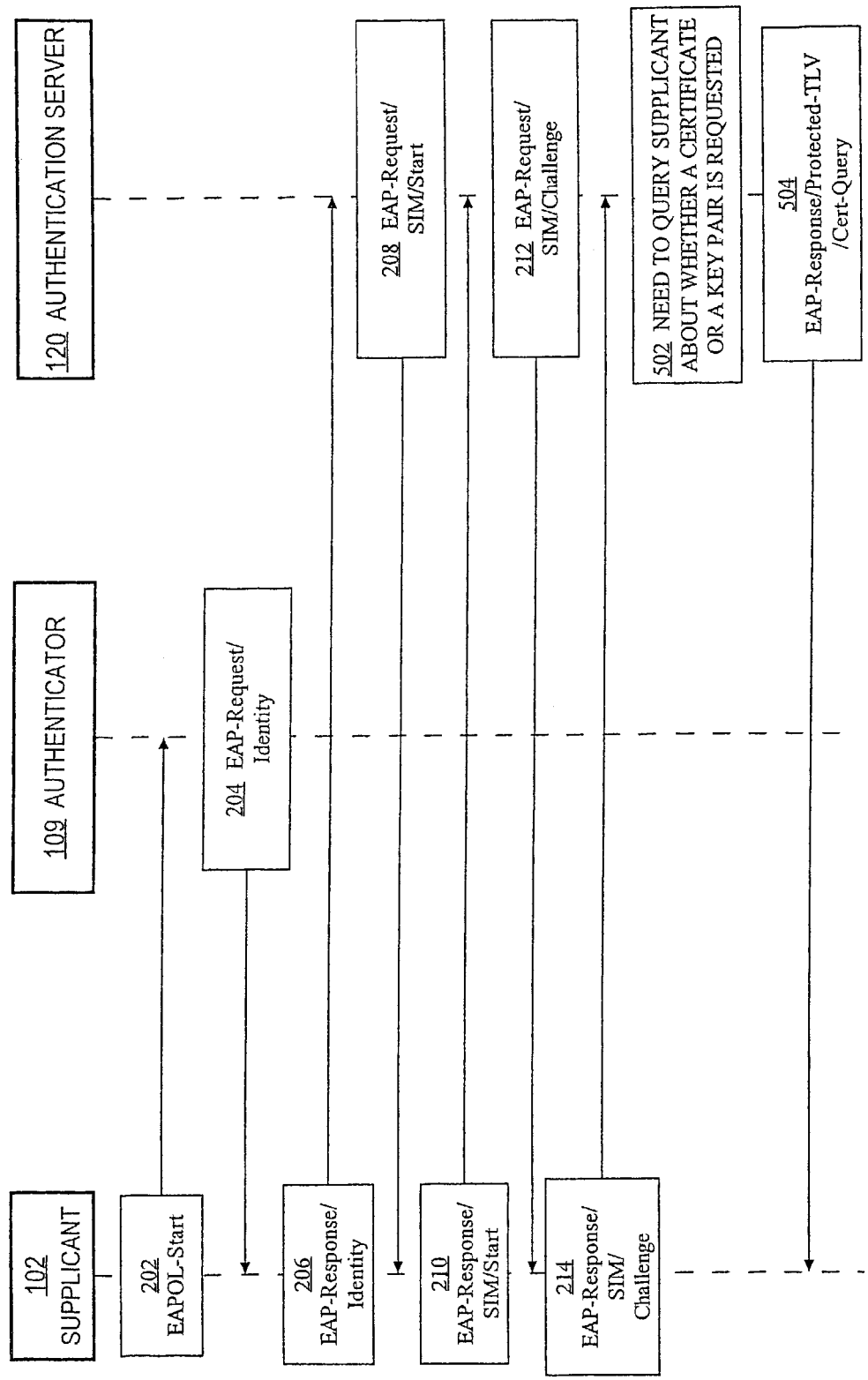

METHOD AND APPARATUS FOR COMMUNICATING CREDENTIAL INFORMATION WITHIN A NETWORK DEVICE AUTHENTICATION CONVERSATION

FIELD OF THE INVENTION

The present invention generally relates to computer network security and authentication. The invention relates more specifically to a method and apparatus for communicating credential information within a network device authentication conversation.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Distributing security credential information for use in verifying and proving the identity of a computer network device is a problem in the fields of network and information security. For example, in cryptosystems that use public key cryptography, there is a need to verify that a public key actually belongs to its purported owner, so that the public key can be trusted. One approach for establishing such trust is to use a root digital certificate to sign the key prior to distribution. For a recipient to then verify the signed key, the recipient must first receive the root certificate in some manner. Thus, examples of credentials for which distribution is commonly needed include public key-private key pairs, digital certificates such as server root certificates and public key certificates, and other material.

Certain packet-switched networks use authentication servers to authenticate clients that request access to protected resources, including end station devices such as servers and printers, and other infrastructure elements such as routers or switches. In this context, a requesting client may wish to receive a credential, such as a digital certificate, to verify an authentication server. Alternative, the client may need to receive its own certificate to use to prove its own identity to another domain. For example, a client may receive a digital certificate from an enterprise domain and then use that certificate to sign communications to other domains. As still another example, there may be a need to distribute a public/private key pair to a device that cannot otherwise perform a key exchange.

Typically, a subscriber and a peer communicate in a non-secure conversation, and the credentials are distributed manually through a separate, out-of-band process that is typically secured using encryption. However, this approach suffers from the drawbacks that a separate out-of-band process must be established and agreed upon by the peers; encryption keys must be exchanged among the peers in some manner; and the existence of a separate channel creates a new opportunity for attack or exploitation by a malicious interloper.

Thus, there is a need for a way to distribute credentials to a subscriber automatically through an in-band process. It would be particularly desirable to have a way to distribute the credentials within the context of an existing secure conversation between the subscriber and peer.

An authentication approach for network devices is described in L. Blunk et al., "PPP Extensible Authentication Protocol," IETF Request for Comments 2284, March 1998. The "EAP" approach of RFC 2284 provides a generalized way for a first network element to authenticate the identity of a second network element.

EAP implementations have been developed for many specific contexts. For example, in the context of mobile wireless devices that use the Global System for Mobile communications (GSM), an approach for authentication and deriving session keys using the GSM Subscriber Identity Module (SIM) is described in H. Haverinen et al., "EAP SIM Authentication," IETF Internet-Draft, February 2003. In these contexts, EAP generally results in exchanging authentication credentials, and may include a key exchange in which peers acquire keys needed to decipher packets sent under a link layer protocol, such as IEEE 802.11.

Because EAP implementations are widely used, it would be desirable to have a way to distribute security credentials within the context of an EAP authentication conversation. The credentials then could be used for protecting the identity of a subscriber, authenticating additional security services, and upgrading security credentials.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A and FIG. 2B are diagrams that illustrate a message conversation between a supplicant and an authenticator to request and to distribute a root certificate or certificate fingerprint that can be used to verify the identity of one or more entities;

FIG. 2C is a diagram that illustrates a variation of the conversation of FIG. 2A, FIG. 2B, in which a generic EAP-Method is used and the authentication server is configured to send a root certificate in a protected type-length-value attribute;

FIG. 3A and FIG. 3B are diagrams that illustrate a message conversation between a supplicant and an authenticator to request and to distribute a private/public key pair and public key certificate to the supplicant;

FIG. 5A and FIG. 5B are diagrams that illustrate a variation of the message conversation of FIG. 4A, FIG. 4B, wherein the authenticator queries the supplicant to determine whether a certificate or key pair is needed;

DETAILED DESCRIPTION OF THE PREFERRED EMBODIMENT

Figure 1A:
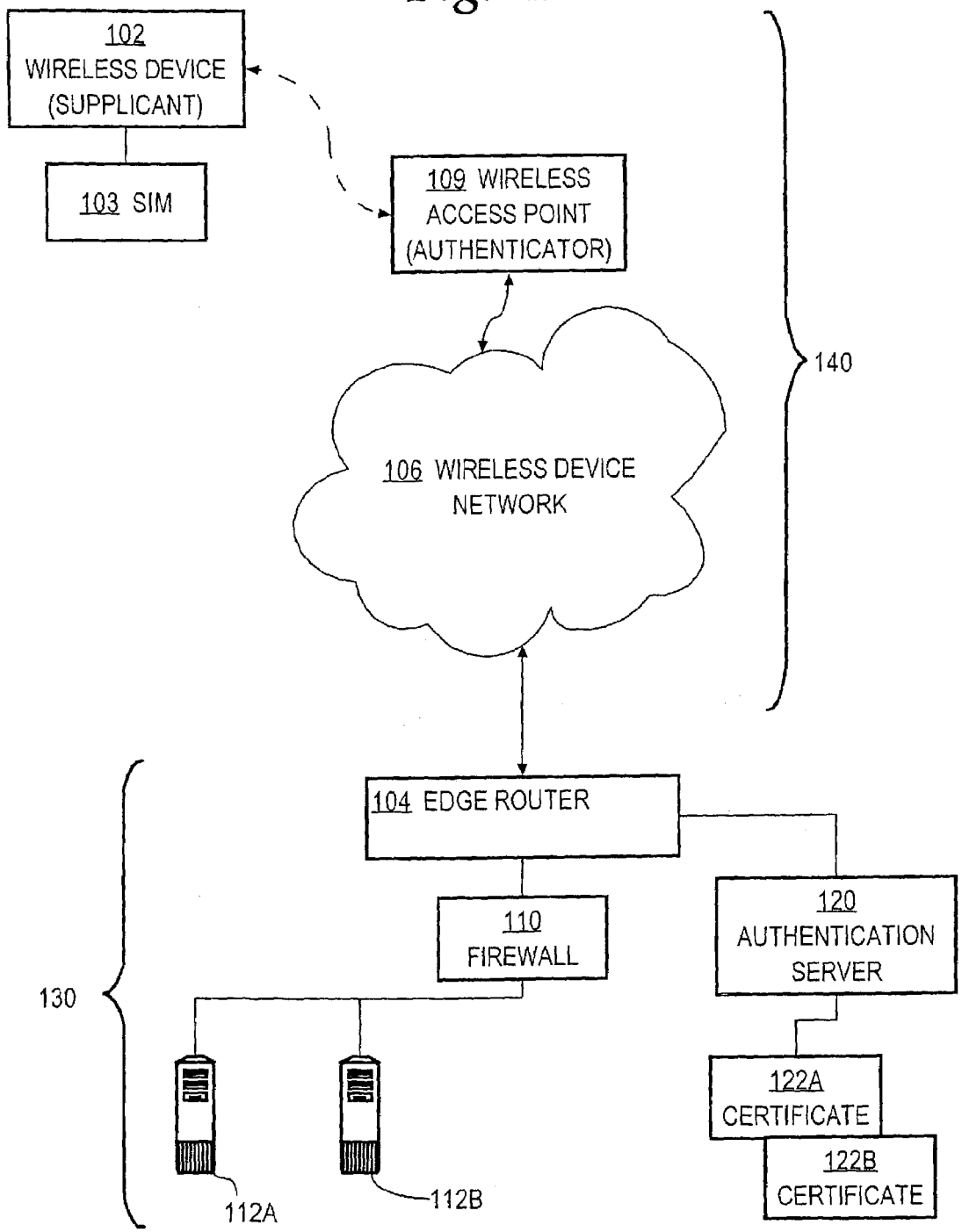
FIG. 1A is a block diagram that illustrates an overview of a network context in which an embodiment may be implemented.

A method and apparatus for communicating credential information within a network device authentication conversation is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Method of Communication Security Credentials
4.0 Implementation Mechanisms—Hardware Overview
5.0 Extensions and Alternatives 1.0 General Overview The needs identified in the foregoing Background, and other needs and objects that will become apparent for the following description, are achieved in the present invention, which comprises, in one aspect, a method for communicating a security credential within a network device authentication conversation. An authenticator that is communicatively coupled to a supplicant through a network performs a first message conversation resulting in creating a security context that is known to the authenticator and the supplicant. A second message conversation is initiated between the authenticator and the supplicant. The second message conversation is cryptographically protected using the same security context that was created in the first message conversation. A security credential is provided to the supplicant in the second message conversation. The second message conversation and first message conversation are then concluded. The first message conversation and the second message conversation are for granting initial network access.

Specific embodiments can bootstrap digital certificates, public/private key pairs, and other credentials to supplicants, in-band, within the context of an EAP-SIM or EAP-AKA conversation, without initiating a new session or exchanging special-purpose keys to protect distribution of the credentials.

In other aspects, the invention encompasses a computer apparatus and a computer-readable medium configured to carry out the foregoing steps.

In one aspect, the present approach provides a method for using EAP-SIM and EAP-AKA to bootstrap certificates or public key pairs into a supplicant. The method may be generalized to other EAP mechanisms based on different security associations. The method can use existing GSM security relationships to verify and bootstrap public key credentials.

The present approach allows credentials to be distributed in band. The credentials can then be used for protecting the identity of the subscriber, authenticating additional security services and upgrading security credentials.

In this mechanism it is assumed that a network subscriber already has credentials to participate in a GSM network using SIM or USIM credentials, such that the subscriber can use EAP-SIM or EAP-AKA authentication. During EAP-SIM and EAP-AKA authentication, a short-term security context is created, which can be used to protect data within the EAP-SIM/AKA transaction and the subsequent session.

In one feature, an embodiment includes a protected attribute to request and an attribute to distribute a root certificate or certificate fingerprint that can be used to verify the identity of one or more entities. This attribute is authenticated, but not necessarily encrypted. In another feature, an embodiment provides an attribute to request and an attribute to distribute a private/public key pair and public key certificate to the supplicant. In another feature, an embodiment provides an attribute to request a public key certificate based on an existing public/private key pair, and to retrieve a certificate. In yet another feature, an embodiment provides an attribute that can be used to verify the endpoint of an encapsulating security protocol that uses public key credentials to authenticate the endpoint, such as PEAP or TTLS.

Embodiments may be used in EAP-compatible authentication servers, such as RADIUS AAA servers, and in 802.1X WLAN EAP supplicants. Embodiments are useful in public wireless LAN environments that make use of GSM credentials.

The disclosed approaches offer numerous improvements over past approaches. For example, in the approaches herein, a supplicant or other client obtains a security credential early in a session. Further, credentials acquired in a first key exchange are used to protect a second exchange, without initiating a separate session, and without otherwise distributing credentials specifically for use in the second exchange.

2.0 Structural and Functional Overview

FIG. 1A is a block diagram that illustrates an overview of a network context in which an embodiment may be implemented. A wireless network device 102 is communicatively coupled wirelessly to a wireless access point 109, which is coupled to a wireless packet network 106. Typically, device 102 is an end station such as a personal computer, personal digital assistant, cellular radiotelephone, etc. In an authentication conversation as further described, device 102 has the role of Supplicant to an Authenticator. Device 102 has an identity verification module 103, comprising electronic hardware, firmware, or a combination, and which enables network 106 or WAP 109 to verify the identity of the device.

Network 106 is any network that can support communication with mobile wireless devices. Typically network 106 is a packet network. In one embodiment, network 106 is a digital wireless packet network that conforms to the IEEE 802.11 standards. In this embodiment, the identity verification module 103 of device 102 is a Subscriber Identity Module (SIM). Optionally, module 103 can execute the Universal Mobile Telecommunications System (UMTS) Authentication and Key Agreement (AKA) mechanism, which is based on symmetric keys.

Collectively the wireless device network 106, WAP 109 and device 102 reside in a public or semi-public network. Network 106 is communicatively coupled to an enterprise network 130 through an edge router 104 and firewall 110. In authentication conversations, WAP 109 typically acts as Authenticator; however, edge router 104 also may serve as an authenticator. The WAP 109 may be granting access to the Internet at a large enterprise or other enterprise. One or more content servers 112A, 112B form part of enterprise network 130, and contain application programs, data or other content of interest to the device 102.

An authentication server 120 is coupled to edge router 104 and stores one or more digital certificates 122A, 122B. The authentication server 120 communicates with edge router 104 using an authentication protocols such as Remove Access Dial-In User Service (RADIUS) or TACACS+. Either the edge router 104 or authentication server 120 has an interface to the wireless device network 106 and can request information from infrastructure elements of that network.

In this arrangement, wireless device 102 can authenticate itself to WAP 109 in an EAP conversation termed EAP over LAN or EAPOL; the WAP and authentication server 120 communicate EAP messages using EAP over RADIUS or an equivalent protocol. When device 102 initially attempts access to a server, such as server 112A, WAP 109 blocks port access to the network 106; if the device authenticates successfully, then port access is opened.

The elements of FIG. 1A are arranged in an example embodiment that includes a limited number of functional elements, for purposes of illustrating a clear example. In alternative embodiments and practical implementations, there may be any number of such elements, and the elements may be arranged in an alternative manner. For example, authentication server 120 may be coupled to a router of enterprise network 130 other than an edge router 104. Further, there may be any number of devices 102 and servers 112A, 112B. Also, edge router 104 may act as a gateway between network 106 and LAN 130. Edge router 104 may be a switch, bridge or relay.

Figure 1B:
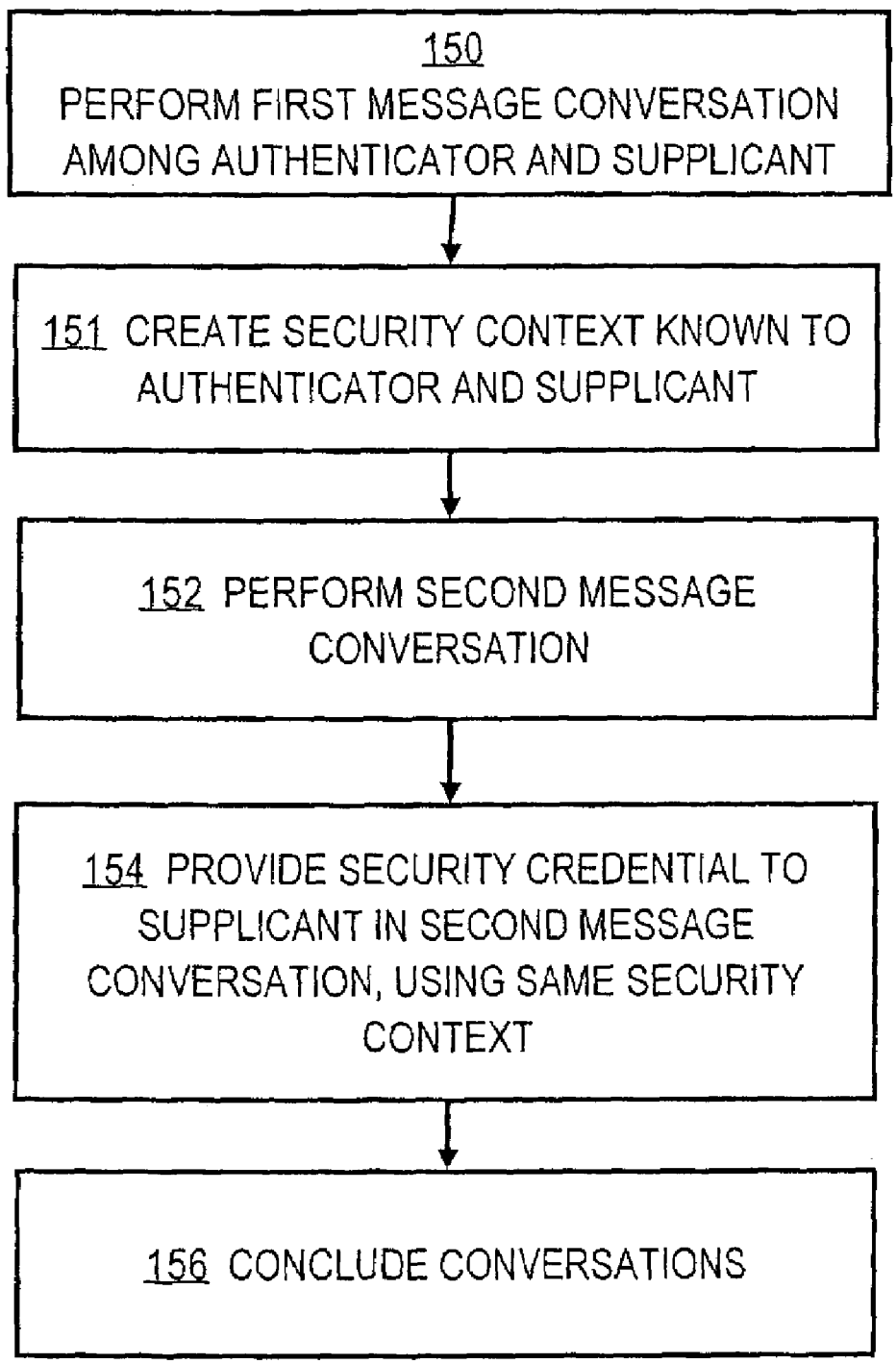
FIG. 1B is a flow diagram that illustrates a high level overview of a process of communicating a security credential within a network device authentication conversation.

FIG. 1B is a flow diagram of a process of communicating a security credential within a network device authentication conversation. The process of FIG. 1B can be performed in the network context of FIG. 1A, or in other contexts.

In block 150 an authenticator, which is communicatively coupled to a supplicant through a network, performs a first message conversation. As a result, a security context that is known to the authenticator and the supplicant is created, as shown in block 151. As part of performing the steps of block 150, a first authentication conversation is initiated. For example, a server or other that permits access only by authenticated clients may receive a request for access from a non-authenticated client. In response, the server initiates a message conversation directed at determining whether the server can authenticate the identity of the client. The server receives a client identifier from the client. The client identifier uniquely identifies the client. For example, when the client is a mobile wireless device operating in a GSM network, the identifying information could be the user's International Mobile Subscriber Identity (IMSI) value or a temporary identity value.

Further, the server may contact a trusted network infrastructure element, provide the device identifying information, and request corresponding authentication information. For example, when the client is a mobile wireless device operating in a GSM network, the server contacts the user's home operator's Authentication Centre and requests one or more GSM triplets. The server also generates one or more encryption keys for selective use in encrypting subsequent communications with the client. The keys are generated based on the authentication information, such as the GSM triplets.

In block 152, a second message conversation is initiated between the authenticator and the supplicant. The second message conversation is cryptographically protected using the same security context that was created in the first message conversation.

As part of block 152, the server can generate and send a message that challenges the client to prove that it is trusted. Further, the server can receive a request to provide validation information that validates the identity of the server. For purposes of illustrating a clear example, the following description assumes that the validation information comprises a digital certificate. However, in other embodiments the validation information could comprise any other useful information. Further, the request may seek information other than validation information, such as public-private key pairs, public key certificates, etc.

In block 154, a security credential is provided to the supplicant in the second message conversation. As part of block 154, for example, the server retrieves a copy of its digital certificate, computes a message authentication code (MAC) over the digital certificate, and sends the certificate and MAC to the client. The MAC may be computed as a hashed MAC using the SHA-1 algorithm, MD-5 algorithm, or any other suitable message authentication or message digest process.

The second message conversation and first message conversation are then concluded, in block 156. As part of block 156, in one embodiment, the server receives a message from the client indicating that the MAC was successfully verified. Thus, the client may verify the MAC by re-computing its own MAC over the received digital certificate, and comparing the computed MAC to the MAC that it received. If a match occurs, the message is verified.

As a result, within a first authentication conversation between a client and server, a digital certificate or other security credential information is exchanged without requiring a separate secure communication channel. The foregoing general process is adaptable to many specific contexts, some of which are now described.

3.0 Method of Communicating Security Credentials

Figure 2B:
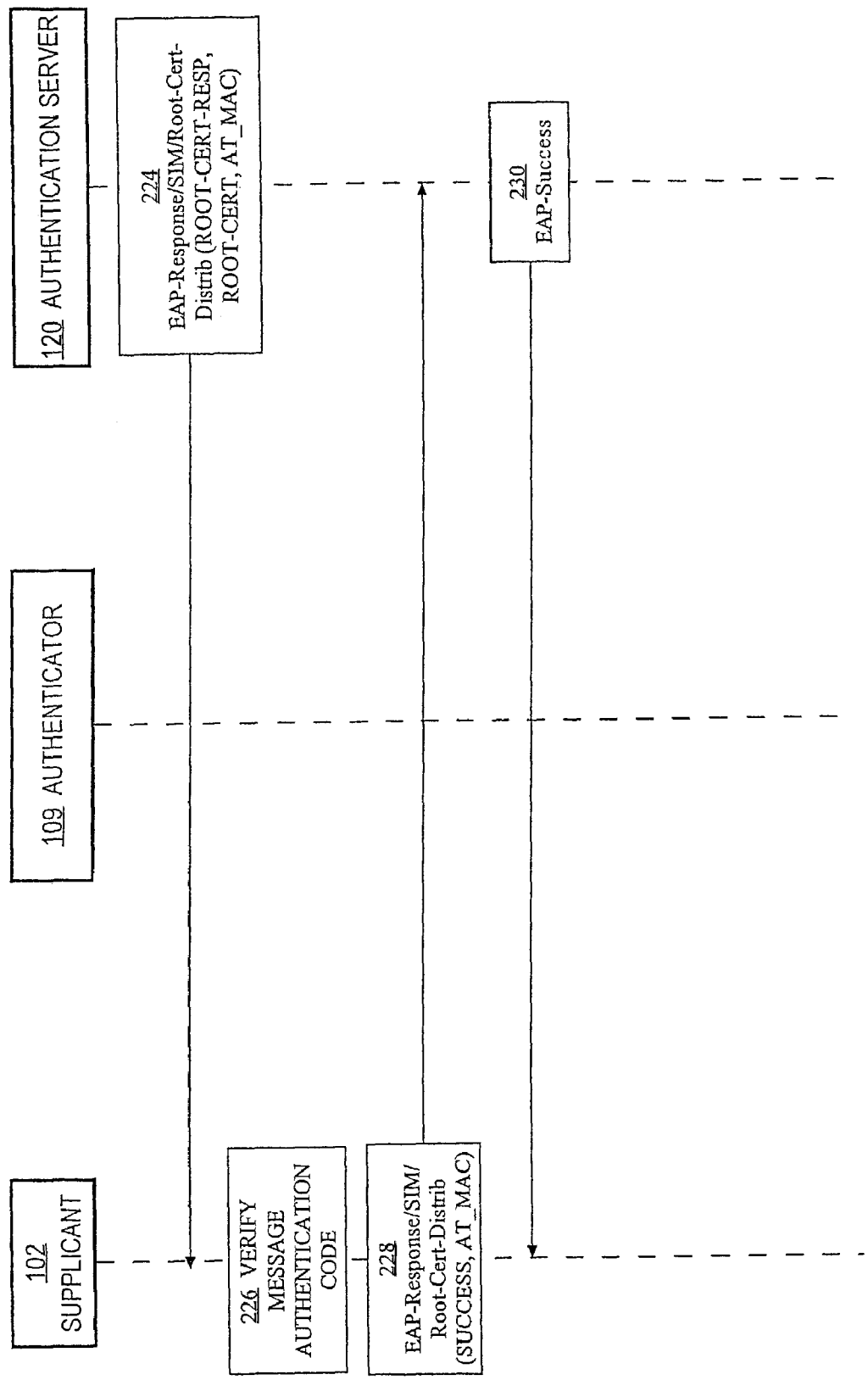

FIG. 2A and FIG. 2B are diagrams that illustrate a message conversation between a supplicant and an authenticator to request and to distribute a root certificate or certificate fingerprint that can be used to verify the identity of one or more entities. FIG. 2A and FIG. 2B show a message conversation that may be used in the context of EAP-SIM authentication, as described in Haverinen et al., cited above. Alternatively, other embodiments may use EAP-AKA authentication, which is described in J. Arkko, "EAP AKA Authentication," February 2003, available at the time of this writing in the document draft-arkko-pppext-eap-aka-09.txt, in directory Internet-Drafts of the IETF.org domain on the World Wide Web.

Referring first to FIG. 2A, a supplicant 102, such as wireless device 102 of FIG. 1A, initiates the conversation by sending an EAP over LAN ("EAPOL") Start message 202 to WAP 109. Typically, EAPOL-Start message 202 is sent by supplicant 102 after the supplicant seeks to access a protected resource and receives a response indicating that access is denied.

The authenticator 109, which may be an edge router, firewall, gateway, or server, then issues an EAP-Request message 204 with subtype Identity. As in conventional EAP-SIM authentication, message 204 operates as a request for the supplicant to identify itself. In response, supplicant 102 sends an EAP-Response message 206 with subtype Identity, and includes identifying information in a message attribute. For example, when the client is a mobile wireless device operating in a GSM network, the identifying information could be the user's International Mobile Subscriber Identity (IMSI) value or a temporary identity value. The message 206 is passed or forwarded to authentication server 120 by authenticator 109. However, a separate identity exchange is not always required for EAP-SIM and AKA.

Message 208 and message 210 represent a negotiation of a version of the EAP-SIM protocol between the supplicant 102 and the authentication server 120. In one embodiment, after receiving client identity information in message 206, authentication server 120 creates a list of EAP-SIM versions that it supports and provides the list as part of EAP-Request/SIM/Start message 208. In response, the supplicant 102 selects a version that it can support, and provides a value identifying the selected version in the EAP-Response/SIM/Start message 210.

Using message 212, authentication server 120 challenges the supplicant 102 to prove that it is the client that was identified using the identity information provided in message 206. For example, authentication server 120 obtains one or more GSM triplets from the user's home operator's Authentication Centre in wireless device network 106. Typically one, two, or three triplets are obtained. From the triplets, the authentication server derives keys, in the manner specified in Haverinen et al. The authentication server 120 then sends an EAP-Request/SIM/Challenge message to supplicant 102 that includes challenge values and a MAC covering the challenge values.

In response, supplicant 102 requests authentication server 120 to provide information that can verify the identity of the authentication server. For example, supplicant 102 sends an EAP-Response/SIM message 214 that includes both a Challenge attribute and an attribute requesting the authentication server 120 to distribute a root digital certificate to the supplicant. In one embodiment, Root-Cert-Distrib attribute indicates the request of the supplicant 102 for a digital certificate.

In block 218, the authentication server retrieves a copy of its root digital certificate, and generates a message authentication code based on the certificate. In block 220, the certificate is packaged in a message attribute. Referring now to FIG. 2B, the authentication server 120 sends a response message 224 to the supplicant 102, and provides the root certificate and authentication code. For example, authentication server 120 sends the message EAP-Response/SIM/Root-Cert-Distrib and includes an attribute indicating that it is responding with its root certificate (ROOT-CERT-RESP), an attribute containing the root certificate (ROOT-CERT), and the message authentication code covering the certificate (AT_MAC).

In block 226, the supplicant 102 attempts to verify the MAC that was received with the certificate. If the supplicant is able to verify the MAC, then the supplicant 102 sends a response message indicating success and proving knowledge of the MAC algorithm, such as EAP-Response/SIM/Root-Cert-Distrib with a SUCCESS attribute and MAC attribute. The authentication server indicates successful end to authentication with an EAP-Success message.

Thus, in the foregoing process the EAP-SIM authentication conversation of a supplicant and authenticator or authentication server is leveraged to provide substantially concurrent distribution of other security credentials, such as a digital certificate.

FIG. 2C is a diagram that illustrates a variation of the conversation of FIG. 2A, FIG. 2B, in which a generic EAP-Method is used and the authentication server is configured to send a root certificate in a protected EAP type-length-value ("TLV") attribute. The process of FIG. 2C is appropriate when the authentication server needs to send a root certificate that the supplicant is not currently using. The use of EAP protected TLV attributes is described in J. Salowey, "Protected EAP TLV," March 2003, available at the time of this writing in the document draft-salowey-eap-protectedtlv-01.txt at the internet-drafts directory of the IETF.org domain on the World Wide Web.

As indicated in FIG. 2C, a process using the steps of FIG. 2C begins by performing step 202 to step 210, inclusive, of FIG. 2A. Also as in FIG. 2A, authentication server 120 issues a challenge request in step 212. In response, in step 240, supplicant 102 issues a conventional response to the challenge request. The response does not include a request for a digital certificate of authentication server 120, but the authentication server is configured to know that it should deliver its root certificate in reply to such a response.

Accordingly, in block 242, authentication server 120 retrieves its digital certificate and packages the certificate in a protected TLV attribute. The protected TLV attribute is encrypted and contains a MAC. In block 244, the authentication server delivers the certificate by sending a response message that includes the certificate. For example, authentication server 120 sends an EAP-TLV Response message that includes an attribute identifying the response as a response that provides a root certificate, the root certificate itself, and a protected TLV that contains a separately encrypted version of the root certificate. Sending an encrypted version of the root certificate allows the supplicant 120 to verify that the certificate is authentic, without use of a separate MAC attribute value, by successfully decrypting the encrypted certificate.

In block 246, the protected TLV attribute is verified. In block 248, the supplicant issues a response indicating success, in the form of an EAP-TLV message. Authentication server 120 may then reply with a success message, as in block 230.

Also, an EAP-SUCCESS message may be used after the SIM phase of FIG. 2C is complete, such as in the case when the process of FIG. 2C is run outside a protected tunnel.

Figure 3A:
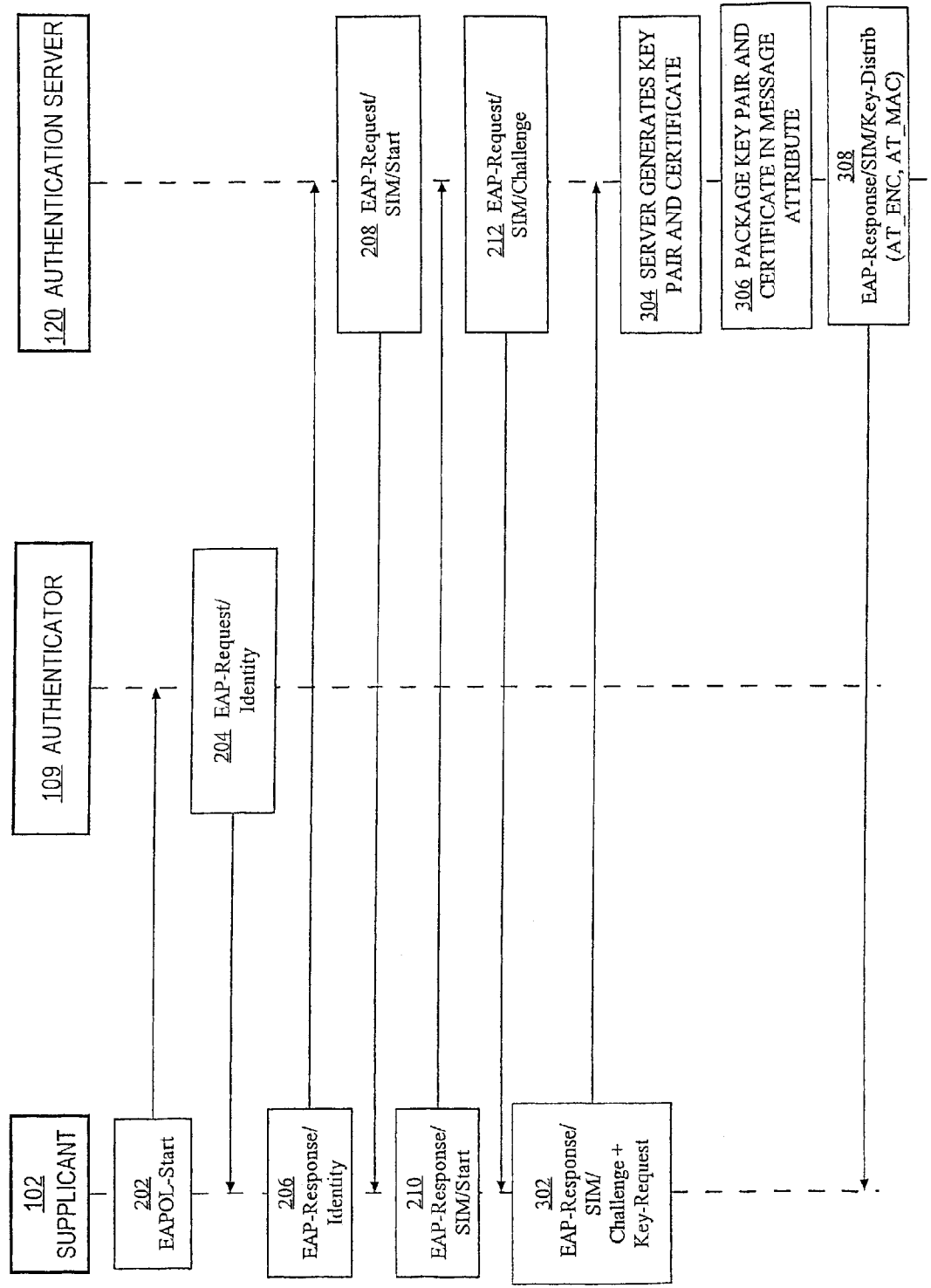

FIG. 3A and FIG. 3B are diagrams that illustrate a message conversation between a supplicant and an authenticator to request and to distribute a private/public key pair and public key certificate to the supplicant. The process may be used to distribute only a certificate for an existing client key pair, or both the key pair and a certificate. Referring first to FIG. 3A, blocks 202 through 212, inclusive, involve messages that are communicated in the same manner and for the same purposes as for like numbered steps of FIG. 2A. In block 302, however, supplicant 120 sends a challenge response message that specifies a key request.

In response, in block 304, authentication server 120 generates a key pair and digital certificate. Block 304 may be performed by another entity in response to a separate request issued by the authentication server 120. Further, block 304 may involve retrieval of a key pair or certificate, or both, from a database, rather than generating the information. In block 306, the key pair and certificate are packaged in an EAP message attribute. In one embodiment, the public key from the key pair and the certificate are packaged in an encrypted attribute of the type identified as "AT_ENC" in RFCs covering EAP. Further, block 306 involves generating a message authentication code covering the entire response. In block 308, the authentication server 120 returns the encrypted key pair and digital certificate, with authentication code, to the supplicant 102 in an EAP response message.

Referring now to FIG. 3B, in block 309, an EAP-Response/SIM/Root-Cert-Distrib message is sent from the authentication server to the supplicant. In block 310, the supplicant 102 verifies the message attribute that contains the key pair and certificate. Verification typically involves generating a new message authentication code over the message attribute and determining if the new message authentication code matches the MAC received with the message.

If verification is successful, then in block 312, the public key is stored by the supplicant 102. Further, the supplicant 102 notifies the authentication server 120 that verification was successful, by sending a success response message in block 314. In one embodiment, the success response message also includes a MAC attribute for verification by the authentication server 120. In block 316, the authentication server acknowledges the success response.

As an alternative, a process equivalent to that of FIG. 3A, FIG. 3B may be performed by using a generic EAP-method with certain values packaged in an EAP protected TLV. In this alternative, block 202 to block 212 are performed as shown in FIG. 3A, FIG. 3B. At block 302, however, a generic EAP-Response/SIM/Challenge message is sent. Upon receiving such a message, authentication server 120 cannot know that the supplicant is specifically requesting a public key of a public-private key pair. Nevertheless, based on stored client profile information, the authentication server may determine that a key distribution is requested.

Therefore, the authentication server 120 generates or retrieves a key pair and certificate, and places the values in a protected TLV attribute. The values are returned to the supplicant in an EAP-Response message with the protected TLV attribute and that identifies the response as a key distribution message. The supplicant 102 verifies the protected TLV value, and responds with a Success message, which is acknowledged by the authentication server 120.

The method of FIG. 3A, FIG. 3B also may be used to authenticate an unauthenticated encapsulating PEAP tunnel. In particular, the EAP-Response/SIM/Root-Cert-Distrib attribute can be used to verify the identity of the endpoint of the encapsulating security protocol that uses public key credentials to for authentication, such as PEAP or TTLS. The public key or certificate chain that is used to establish the security in the encapsulating protocol must be certified by the certificate of the Root-Cert-Distrib attribute.

Figure 4A:
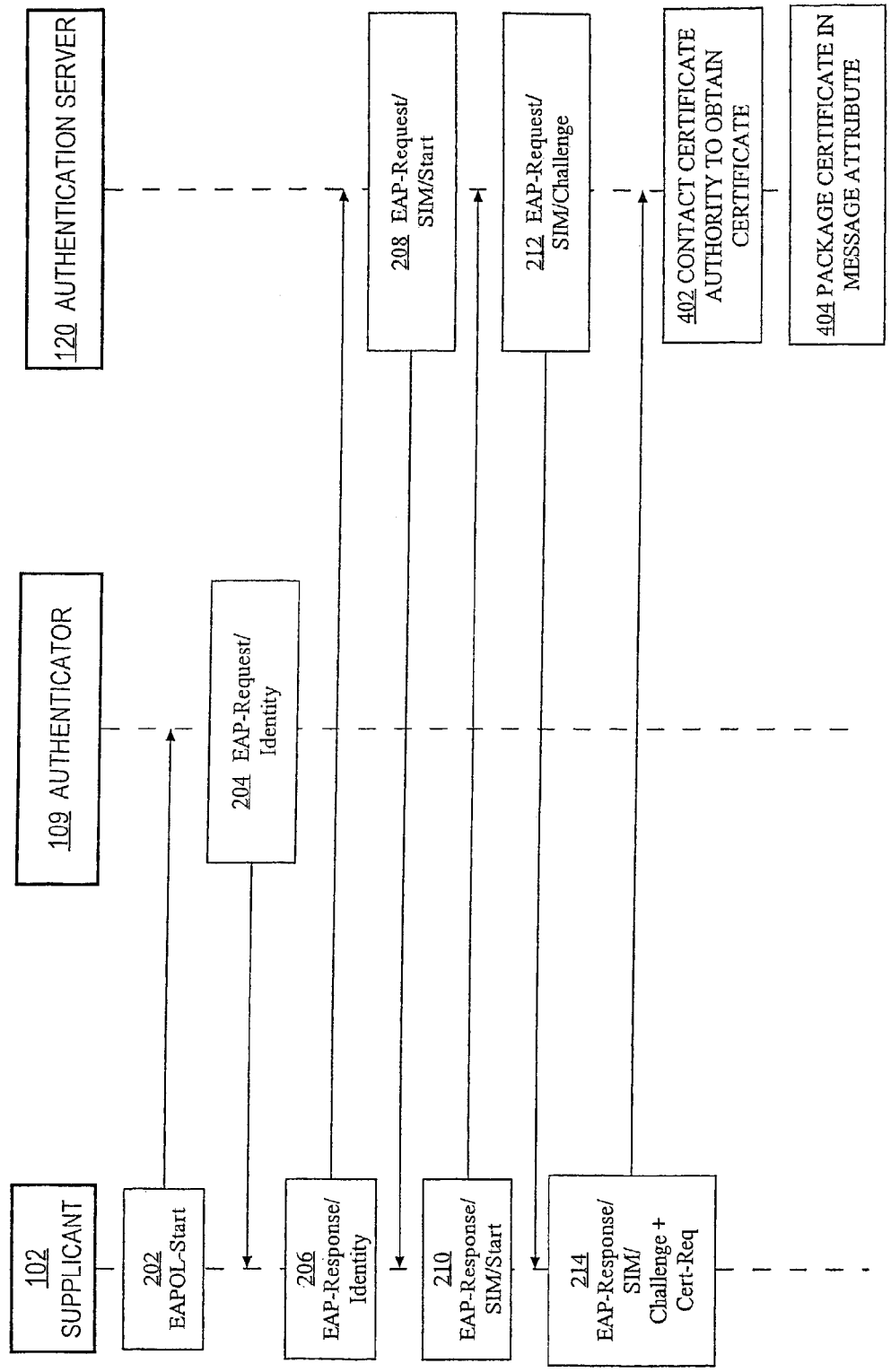
FIG. 4A and FIG. 4B are diagrams that illustrate a message conversation between a supplicant and an authenticator to request a public key certificate based on an existing public-private key pair and to retrieve a certificate.
Figure 4B:
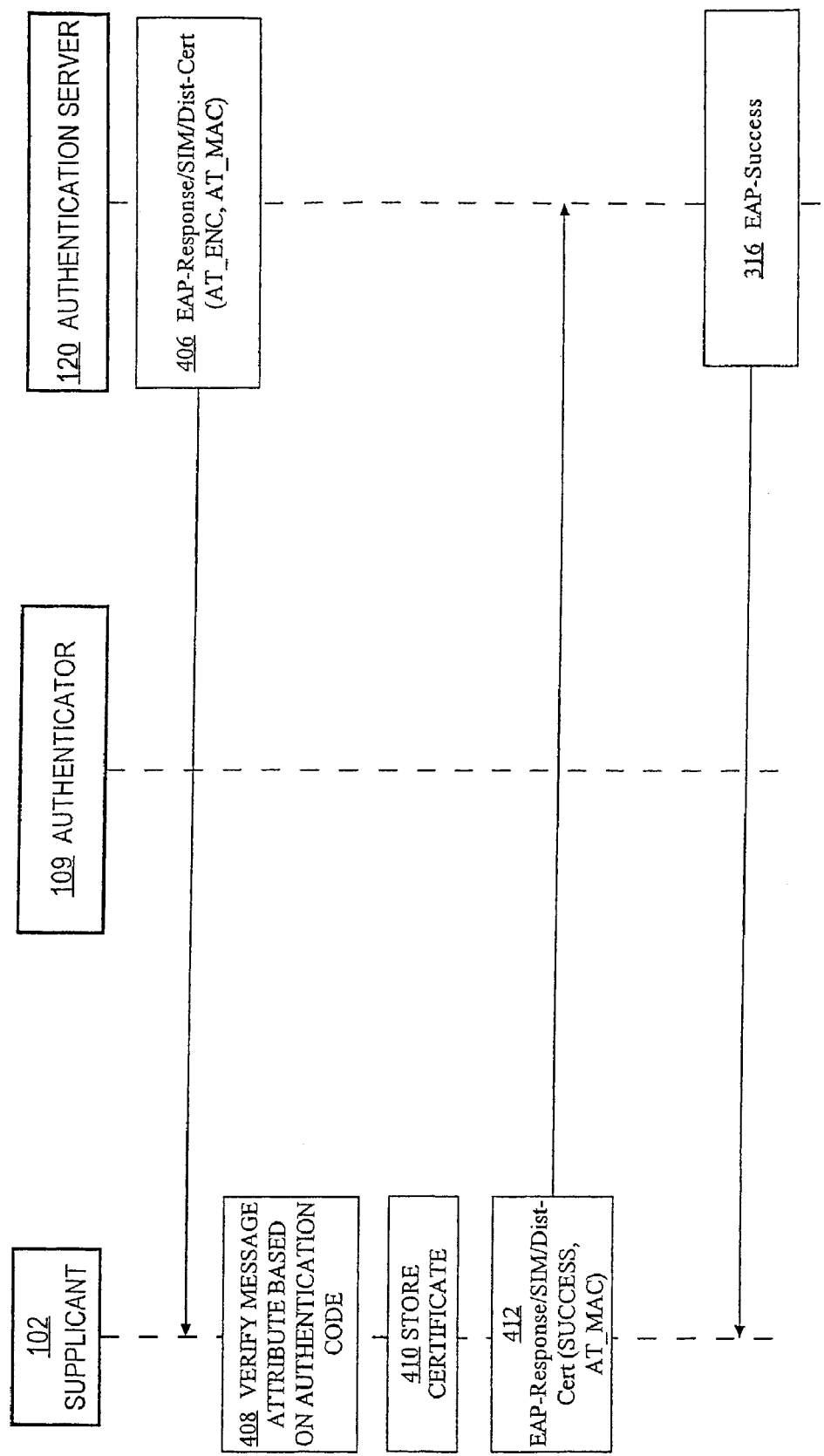

FIG. 4A and FIG. 4B are diagrams that illustrate a message conversation between a supplicant and an authenticator to request a public key certificate based on an existing public-private key pair and to retrieve a certificate. In the scenario represented by FIG. 4A, FIG. 4B, the supplicant 102 has the capability to generate its own public-private key pairs; therefore, the supplicant only needs to request a certificate. The certificates may be valid for a long period of time or a short period of time.

Referring first to FIG. 4A, blocks 202 to 214, inclusive, are performed as described above with respect to FIG. 2A. Block 214 involves presenting only a certificate request to the authentication server 120. The certificate request contains a standard certificate request, such as PKCS#10. In response, the authentication server 120 contacts a certificate authority, or other third party or element, to obtain a certificate for the supplicant. In block 404 the certificate received from the third party is packaged in a message attribute. In one specific embodiment, the certificate is packaged in an AT_CERT message attribute within an encrypted AT_ENC attribute to protect the privacy of the identity in the certificate. Referring now to FIG. 4B, a response message containing the encrypted attribute and a message authentication code is sent to the supplicant in block 406.

At block 408, the supplicant 102 verifies the message authentication code using the techniques described above for verification. If verification is successful, then in block 410 the certificate is stored. Further, in block 412 a response message indicating success is sent back to the authentication server 120. The authentication server acknowledges success with a responsive success message, as shown in block 316.

Figure 5B:
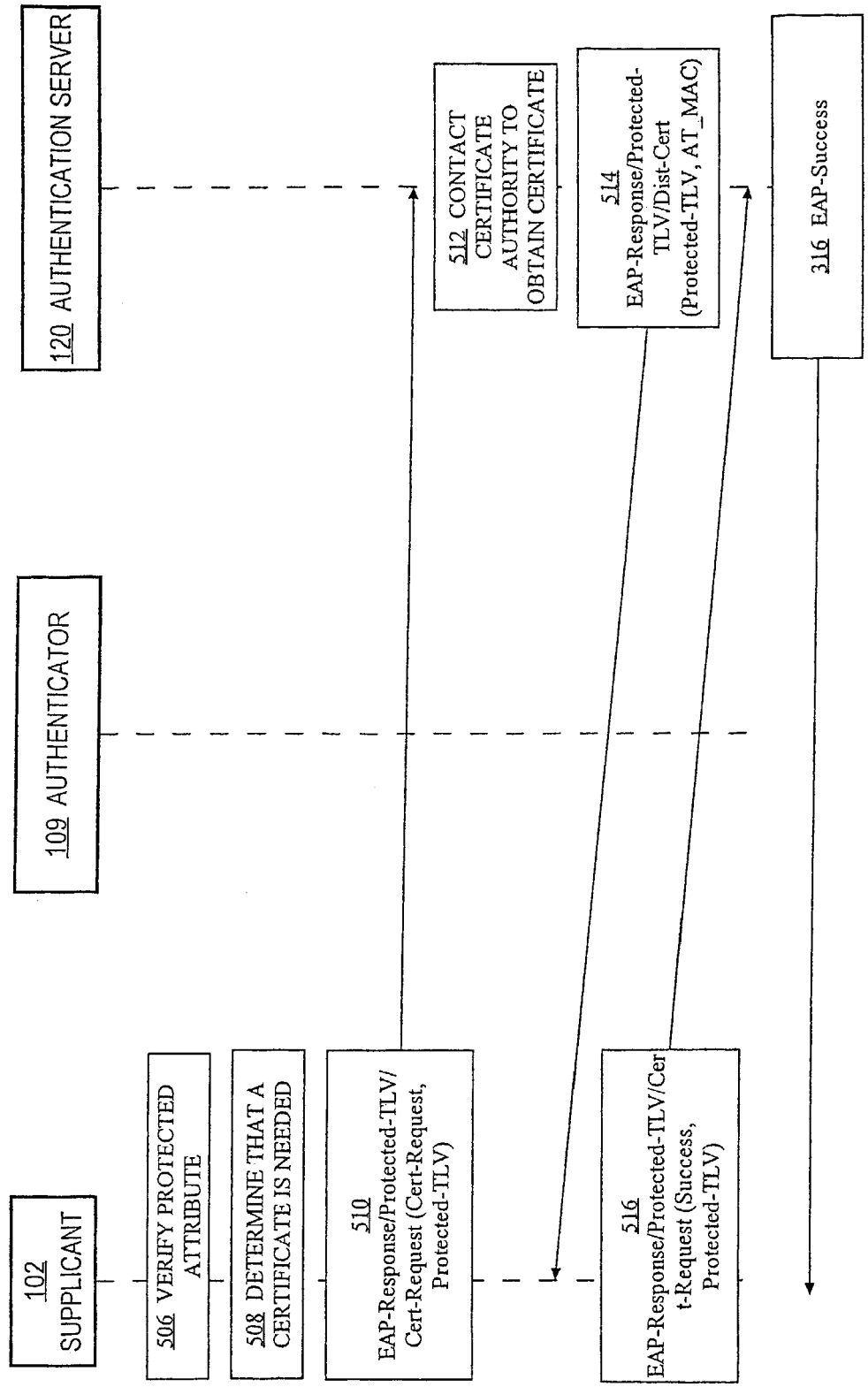

As an alternative, a process equivalent to that of FIG. 4A, FIG. 4B may be performed by using a generic EAP-method with certain values packaged in an EAP protected TLV. However, in this alternative, the server cannot respond proactively, because it does not have sufficient information associated with or in the certificate request. Therefore, the authentication server needs to request additional information from the supplicant. FIG. 5A and FIG. 5B are diagrams that illustrate a variation of the message conversation of FIG. 4A, FIG. 4B, wherein the authenticator queries the supplicant to determine whether a certificate or key pair is needed.

Referring first to FIG. 5A, block 202 to block 214 are performed in accordance with the description given above for like-numbered steps with respect to FIG. 2A. However, in block 502, the authentication server 120 determines that it needs to query the supplicant about whether a certificate or a key pair has been requested in the response of block 214. The determination of block 502 can occur when the client does not use a certificate to authenticate the authentication server 120 as part of the response of block 214. In block 504, the authentication server 120 sends a response message that prompts the supplicant to specify whether it is requesting a certificate or a key pair. In one specific embodiment, the request is packaged in a protected TLV of the response message.

In block 506, the supplicant verifies the protected TLV of the response message, and determines that a certificate request is appropriate, at block 508. The supplicant issues a request for a certificate at block 510 in the form of a response message.

In block 512, the authentication server contacts a certificate authority to obtain a digital certificate for the supplicant. The certificate is sent to the supplicant as part of a response message at block 514. In one specific embodiment, the message of block 514 returns the certificate in a protected TLV attribute within an encrypted AT_ENC attribute to protect the privacy of the identity in the certificate. A message authentication code is also provided.

Upon receiving the encrypted certificate, the supplicant verifies the message authentication code in the manner indicated above for other verification. If verification is successful, then a success indication is sent to the authentication server, as indicated by block 516. The authentication server acknowledges success with a response message at block 316.

4.0 Implementation Mechanisms—Hardware Overview

Figure 6:
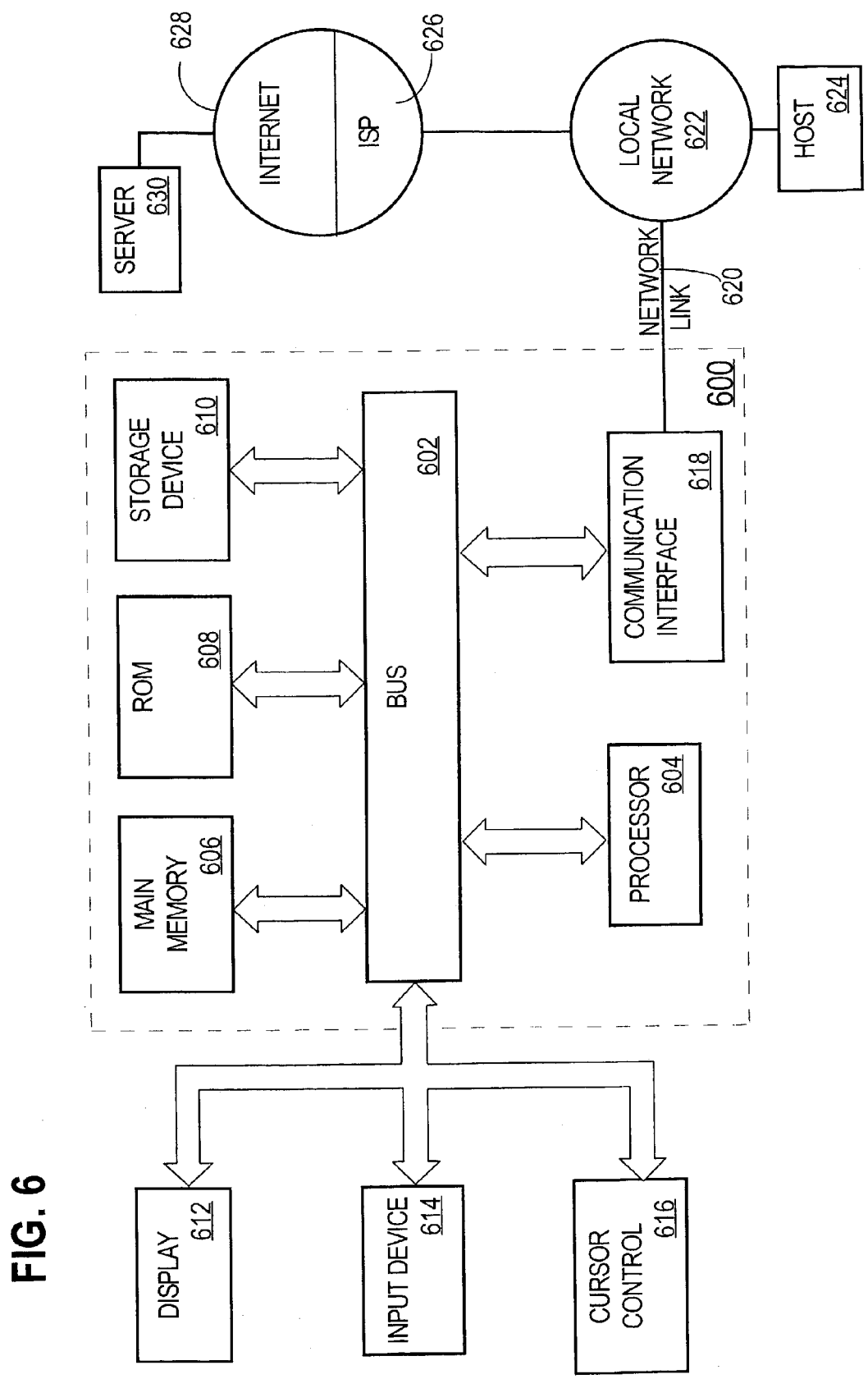
FIG. 6 is a block diagram that illustrates a computer system upon which an embodiment may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory ("RAM") or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory ("ROM") 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube ("CRT"), for displaying information to a computer user. An input device 614, including alphanumeric and other keys, is coupled to bus 602 for communicating information and command selections to processor 604. Another type of user input device is cursor control 616, such as a mouse, trackball, stylus, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for communicating credential information within a network device authentication conversation. According to one embodiment of the invention, communicating credential information within a network device authentication conversation is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector can receive the data carried in the infrared signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network ("ISDN") card or a modem to provide a data communication connection to a corresponding type of telephone line. As another example, communication interface 618 may be a local area network ("LAN") card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider ("ISP") 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. One such downloaded application provides for communicating credential information within a network device authentication conversation as described herein.

Processor 604 may execute the received code as it is received, and/or stored in storage device 610, or other non-volatile storage for later execution. In this manner, computer system 600 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of communicating a security credential within a network device authentication conversation, the method comprising the computer-implemented steps of:

performing, at an authenticator that is communicatively coupled to a supplicant through a network, a first message conversation resulting in creating a security context that is known to the authenticator and the supplicant;

initiating a second message conversation between the authenticator and the supplicant, wherein the second message conversation is cryptographically protected using the same security context that was created in the first message conversation;

providing a security credential to the supplicant in the second message conversation;

concluding the second message conversation and the first message conversation;

wherein the first message conversation and the second message conversation are for granting initial network access.

2. A method as recited in claim 1 wherein the first message conversation is an EAP-SIM conversation.

3. A method as recited in claim 1, wherein the first message conversation is an EAP-AKA conversation.

4. A method as recited in claim 1, wherein the security credential is a root digital certificate of an authentication server associated with the authenticator.

5. A method as recited in claim 1, wherein the security credential is a public/private key pair for the supplicant.

6. A method as recited in claim 1, wherein the security credential is a digital certificate that is requested for the supplicant from a third party.

7. A method as recited in claim 1, wherein the security credential is provided to the supplicant in an EAP-Response message, wherein the EAP-Response message includes the security credential, and a message authentication code attribute containing a message authentication code that is generated based on the security credential.

8. A method as recited in claim 1, wherein the supplicant further performs the computer-implemented steps of:
    sending an EAP response message that requests a digital certificate from an authentication server associated with the authenticator;
    receiving an EAP response message that contains a digital certificate and a message authentication code based on the digital certificate;
    verifying the message authentication code with respect to the digital certificate;
    when verification is successful, sending an EAP response message that indicates successful verification.

9. A method as recited in claim 1, wherein the security credential is provided in a protected type-length-value (TLV) attribute of an EAP response message.

10. A method as recited in claim 1, wherein the second message conversation is initiated by the supplicant using a generic EAP-method, wherein the second message conversation further comprises issuing a query to the supplicant about whether a certificate or a key pair is requested, and wherein the second message conversation further comprises providing either a certificate or a key pair to the supplicant based on a response to the query.

11. A method of distributing a security credential to a network device within an extensible authentication protocol (EAP) authentication conversation, the method comprising the computer-implemented steps of:
    performing, at an authenticator that is communicatively coupled to a supplicant through a network, an EAP-SIM message conversation resulting in creating a security context that is known to the authenticator and the supplicant;
    during the EAP-SIM message conversation, receiving a request for the security credential, wherein the request is formatted as a first EAP message;
    providing the security credential to the supplicant in a second EAP message, wherein the security credential is cryptographically protected using the security context;
    providing to the supplicant in the second EAP message, verification information based on the security credential;
    wherein the EAP-SIM message conversation is for granting initial network access.

12. A method as recited in claim 11, wherein the security credential is a root digital certificate of an authentication server associated with the authenticator.

13. A method as recited in claim 11, wherein the security credential is a public/private key pair for the supplicant.

14. A method as recited in claim 11, wherein the security credential is a digital certificate that is requested for the supplicant from a third party.

15. A method as recited in claim 11, wherein the first EAP message is an EAP-Response message, wherein the EAP-Response message includes the security credential, and a message authentication code attribute containing a message authentication code that is generated based on the security credential.

16. A method as recited in claim 11, wherein the supplicant further performs the computer-implemented steps of:
    sending the first EAP message that requests a digital certificate from an authentication server associated with the authenticator;
    receiving the second EAP message, which comprises a digital certificate and a message authentication code based on the digital certificate;
    verifying the message authentication code with respect to the digital certificate;
    when verification is successful, sending a third EAP message that indicates successful verification.

17. A method as recited in claim 11, wherein the security credential is provided in a protected type-length-value (TLV) attribute of an EAP response message.

18. A computer-readable medium carrying one or more sequences of instructions for communicating a security credential within a network device authentication conversation, which instructions, when executed by one or more processors, cause the one or more processors to carry out the steps of:
    performing, at an authenticator that is communicatively coupled to a supplicant through a network, a first message conversation resulting in creating a security context that is known to the authenticator and the supplicant;
    initiating a second message conversation between the authenticator and the supplicant, wherein the second message conversation is cryptographically protected using the same security context that was created in the first message conversation;
    providing a security credential to the supplicant in the second message conversation;
    concluding the second message conversation and the first message conversation;
    wherein the first message conversation and the second message conversation are for granting initial network access.

19. A computer-readable medium as recited in claim 18 wherein the first message conversation is an EAP-SIM conversation.

20. A computer-readable medium as recited in claim 18, wherein the first message conversation is an EAP-AKA conversation.

21. A computer-readable medium as recited in claim 18, wherein the security credential is a root digital certificate of an authentication server associated with the authenticator.

22. A computer-readable medium as recited in claim 18, wherein the security credential is a public/private key pair for the supplicant.

23. A computer-readable medium as recited in claim 18, wherein the security credential is a digital certificate that is requested for the supplicant from a third party.

24. A computer-readable medium as recited in claim 18, wherein the security credential is provided to the supplicant in an EAP-Response message, wherein the EAP-Response message includes the security credential, and a message authentication code attribute containing a message authentication code that is generated based on the security credential.

25. A computer-readable medium as recited in claim 18, further comprising instructions wherein the supplicant further performs the steps of:
   sending an EAP response message that requests a digital certificate from an authentication server associated with the authenticator;
   receiving an EAP response message that contains a digital certificate and a message authentication code based on the digital certificate;
   verifying the message authentication code with respect to the digital certificate;
   when verification is successful, sending an EAP response message that indicates successful verification.

26. A computer-readable medium as recited in claim 18, wherein the security credential is provided in a protected type-length-value (TLV) attribute of an EAP response message.

27. A computer-readable medium as recited in claim 18, wherein the second message conversation is initiated by the supplicant using a generic EAP-method, wherein the second message conversation further comprises issuing a query to the supplicant about whether a certificate or a key pair is requested, and wherein the second message conversation further comprises providing either a certificate or a key pair to the supplicant based on a response to the query.

28. An apparatus for communicating a security credential within a network device authentication conversation, comprising:
   means for performing, at an authenticator that is communicatively coupled to a supplicant through a network, a first message conversation resulting in creating a security context that is known to the authenticator and the supplicant;
   means for initiating a second message conversation between the authenticator and the supplicant, wherein the second message conversation is cryptographically protected using the same security context that was created in the first message conversation;
   means for providing a security credential to the supplicant in the second message conversation; and
   means for concluding the second message conversation and the first message conversation;
   wherein the first message conversation and the second message conversation are for granting initial network access.

29. An apparatus as recited in claim 28 wherein the first message conversation is an EAP-SIM conversation.

30. An apparatus as recited in claim 28, wherein the first message conversation is an EAP-AKA conversation.

31. An apparatus as recited in claim 28, wherein the security credential is a root digital certificate of an authentication server associated with the authenticator.

32. An apparatus as recited in claim 28, wherein the security credential is a public/private key pair for the supplicant.

33. An apparatus as recited in claim 28, wherein the security credential is a digital certificate that is requested for the supplicant from a third party.

34. An apparatus as recited in claim 28, wherein the security credential is provided to the supplicant in an EAP-Response message, wherein the EAP-Response message includes the security credential, and a message authentication code attribute containing a message authentication code that is generated based on the security credential.

35. An apparatus as recited in claim 28, wherein the supplicant further comprises:
   means for sending an EAP response message that requests a digital certificate from an authentication server associated with the authenticator;
   means for receiving an EAP response message that contains a digital certificate and a message authentication code based on the digital certificate;
   means for verifying the message authentication code with respect to the digital certificate;
   means for sending, when verification is successful, an EAP response message that indicates successful verification.

36. An apparatus as recited in claim 28, wherein the security credential is provided in a protected type-length-value (TLV) attribute of an EAP response message.

37. An apparatus as recited in claim 28, wherein the second message conversation is initiated by the supplicant using a generic EAP-method, wherein the second message conversation further comprises issuing a query to the supplicant about whether a certificate or a key pair is requested, and wherein the second message conversation further comprises providing either a certificate or a key pair to the supplicant based on a response to the query.

38. An apparatus for communicating a security credential within a network device authentication conversation, comprising:
   a network interface that is coupled to the data network for receiving one or more packet flows therefrom;
   a processor;
   one or more stored sequences of instructions which, when executed by the processor, cause the processor to carry out the steps of:
      performing, at an authenticator that is communicatively coupled to a supplicant through a network, a first message conversation resulting in creating a security context that is known to the authenticator and the supplicant;
      initiating a second message conversation between the authenticator and the supplicant, wherein the second message conversation is cryptographically protected using the same security context that was created in the first message conversation;
      providing a security credential to the supplicant in the second message conversation;
      concluding the second message conversation and the first message conversation;
      wherein the first message conversation and the second message conversation are for granting initial network access.

39. An apparatus as recited in claim 38 wherein the first message conversation is an EAP-SIM conversation.

40. An apparatus as recited in claim 38, wherein the first message conversation is an EAP-AKA conversation.

41. An apparatus as recited in claim 38, wherein the security credential is a root digital certificate of an authentication server associated with the authenticator.

42. An apparatus as recited in claim 38, wherein the security credential is a public/private key pair for the supplicant.

43. An apparatus as recited in claim 38, wherein the security credential is a digital certificate that is requested for the supplicant from a third party.

44. An apparatus as recited in claim 38, wherein the security credential is provided to the supplicant in an EAP- Response message, wherein the EAP-Response message includes the security credential, and a message authentication code attribute containing a message authentication code that is generated based on the security credential.

45. An apparatus as recited in claim 38, wherein the supplicant further performs the computer-implemented steps of:
 sending an EAP response message that requests a digital certificate from an authentication server associated with the authenticator;
 receiving an EAP response message that contains a digital certificate and a message authentication code based on the digital certificate;
 verifying the message authentication code with respect to the digital certificate;
 when verification is successful, sending an EAP response message that indicates successful verification.

46. An apparatus as recited in claim 38, wherein the security credential is provided in a protected type-length-value (TLV) attribute of an EAP response message.

47. An apparatus as recited in claim 38, wherein the second message conversation is initiated by the supplicant using a generic EAP-method, wherein the second message conversation further comprises issuing a query to the supplicant about whether a certificate or a key pair is requested, and wherein the second message conversation further comprises providing either a certificate or a key pair to the supplicant based on a response to the query.

* * * * *